US009059887B2

(12) United States Patent
Umeda et al.

(10) Patent No.: US 9,059,887 B2
(45) Date of Patent: Jun. 16, 2015

(54) RECEIVING DEVICE AND RECEIVING METHOD FOR DETERMINING DOPPLER FREQUENCY FROM PILOT SIGNALS USING OFDM

(71) Applicants: FUJITSU LIMITED, Kawasaki-shi, Kanagawa (JP); FUJITSU SEMICONDUCTOR LIMITED, Yokohama, Kanagawa (JP)

(72) Inventors: Masataka Umeda, Yokohama (JP); Naoto Adachi, Yokohama (JP)

(73) Assignees: FUJITSU LIMITED, Kawasaki (JP); FUJITSU SEMICONDUCTOR LIMITED, Yokohama (JP)

( * ) Notice: Subject to any disclaimer, the term of this patent is extended or adjusted under 35 U.S.C. 154(b) by 133 days.

(21) Appl. No.: 13/870,572

(22) Filed: Apr. 25, 2013

(65) Prior Publication Data

US 2013/0301759 A1    Nov. 14, 2013

(30) Foreign Application Priority Data

May 9, 2012    (JP) .................................. 2012-107558

(51) Int. Cl.
*H04L 27/06*    (2006.01)
*H04L 27/26*    (2006.01)

(52) U.S. Cl.
CPC .................................. *H04L 27/265* (2013.01)

(58) Field of Classification Search
CPC . H04L 25/067; H04L 1/0045; H04L 27/2647; H04L 1/005; H04L 1/0054; H04L 27/2669; H04L 27/2695; H04L 27/265
USPC ......... 375/340, 347, 346, 260, 224, 343, 316, 375/135; 370/208
See application file for complete search history.

(56) References Cited

U.S. PATENT DOCUMENTS 8,064,507 B1 *  11/2011  Cheng et al. ................... 375/224
8,149,905 B1 *  4/2012  Cheng et al. ................... 375/224
(Continued)

FOREIGN PATENT DOCUMENTS

| JP | 2005-286636 A | 10/2005 |
| JP | 2010-062865 A | 3/2010 |
| JP | 2010-268044 A | 11/2010 |
| JP | 2010-268274 A | 11/2010 |
| JP | 2010-288178 A | 12/2010 |

OTHER PUBLICATIONS

Lihua Yang; Guangliang Ren; Zhiliang Qiu, "A Novel Doppler Frequency Offset Estimation Method for DVB-T System in HST Environment," Broadcasting, IEEE Transactions on , vol. 58, No. 1, pp. 139,143, Mar. 2012.*

(Continued)

*Primary Examiner* — Daniel Washburn
*Assistant Examiner* — Amneet Singh
(74) *Attorney, Agent, or Firm* — Arent Fox LLP

(57) ABSTRACT

A receiving device for receiving OFDM signals in which arrangement of pilot signals changes with symbol time, includes: an inverse Fourier transform unit configured to calculate an impulse response by performing an inverse Fourier transform on pilot signals included in a received signal; a first Doppler frequency estimation unit configured to estimate a first Doppler frequency from a phase rotation amount at peak positions between impulse responses of pilot signals of different subcarriers of the impulse responses; a second Doppler frequency estimation unit configured to estimate a second Doppler frequency from a phase rotation amount between impulse responses of pilot signals of the same subcarrier of the impulse responses; and a Doppler frequency selection unit configured to select one of the first and the second Doppler frequency estimated by the first and the second Doppler frequency estimation unit so as to reduce influence of a multipath.

6 Claims, 12 Drawing Sheets

(56) References Cited

U.S. PATENT DOCUMENTS

| | | | |
|---|---|---|---|
| 2004/0190657 A1* | 9/2004 | Seki et al. | 375/347 |
| 2006/0269016 A1* | 11/2006 | Long et al. | 375/340 |
| 2007/0030798 A1* | 2/2007 | Okada | 370/208 |
| 2008/0075186 A1* | 3/2008 | Kawauchi et al. | 375/260 |
| 2008/0101490 A1* | 5/2008 | Kawauchi et al. | 375/260 |
| 2008/0165871 A1* | 7/2008 | Kisoda et al. | 375/260 |
| 2008/0192843 A1* | 8/2008 | Tenny et al. | 375/260 |
| 2009/0207956 A1* | 8/2009 | Kimura et al. | 375/346 |
| 2009/0323789 A1* | 12/2009 | Ragab et al. | 375/224 |
| 2010/0128823 A1* | 5/2010 | Sasaoka et al. | 375/343 |
| 2011/0064163 A1* | 3/2011 | Li et al. | 375/316 |
| 2011/0216808 A1* | 9/2011 | Tong et al. | 375/135 |
| 2011/0310945 A1* | 12/2011 | Sato | 375/224 |
| 2012/0020427 A1* | 1/2012 | Butussi et al. | 375/285 |
| 2013/0121392 A1* | 5/2013 | Thompson et al. | 375/227 |

OTHER PUBLICATIONS

Yucek, T.; Tannious, R.M.A.; Arslan, H., "Doppler spread estimation for wireless OFDM systems," Advances in Wired and Wireless Communication, 2005 IEEE/Sarnoff Symposium on , vol., No., pp. 233,236, Apr. 18-19, 2005.*

Hayashi, H.; Okamoto, E.; Iwanami, Y., "A fast fading channel estimation scheme for OFDM with sparse and scattered pilot symbols," Intelligent Signal Processing and Communication Systems, 2009. ISPACS 2009. International Symposium on , vol., no., pp. 154,157, Jan. 7-9, 2009.*

Daisuke Jitsukawa et al., "Accurate Doppler frequency detection for OFDM", Fujitsu Laboratories Ltd., p. 564, 2004.

* cited by examiner

RELATED ART

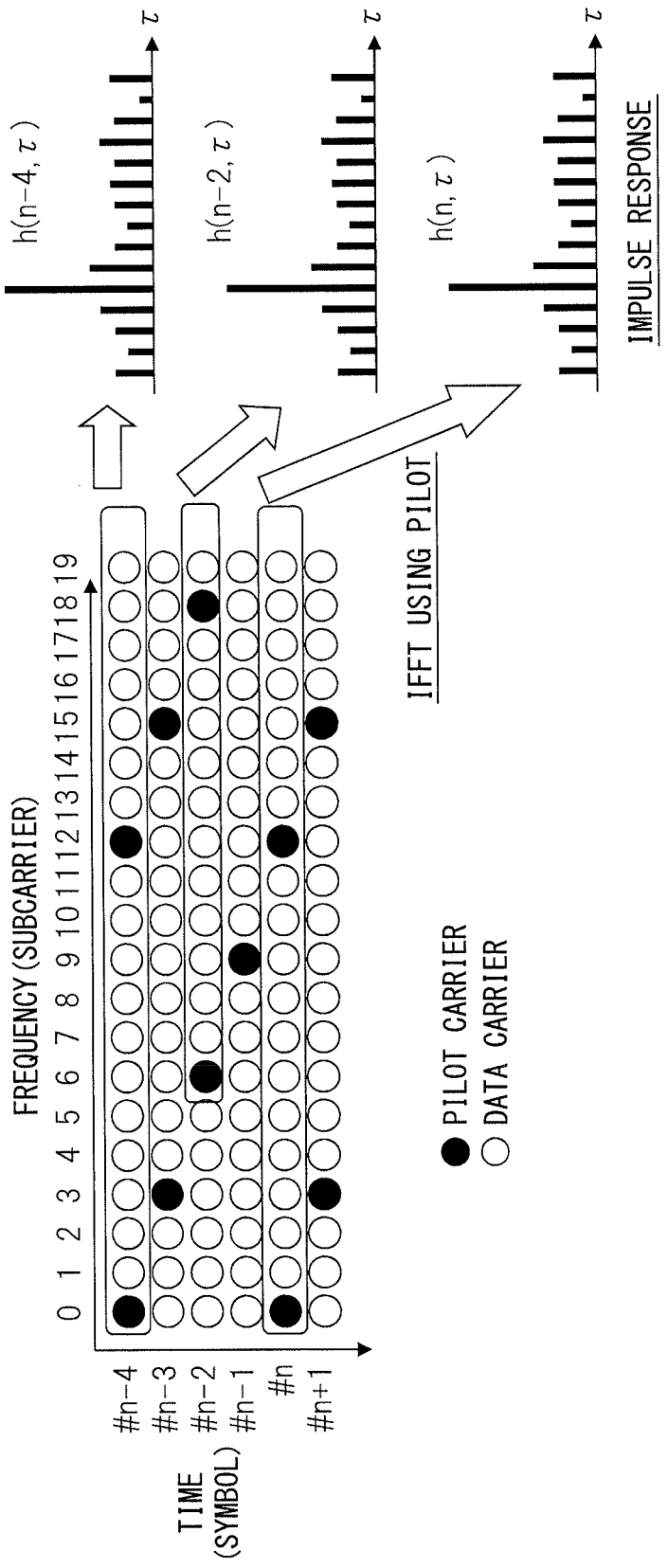

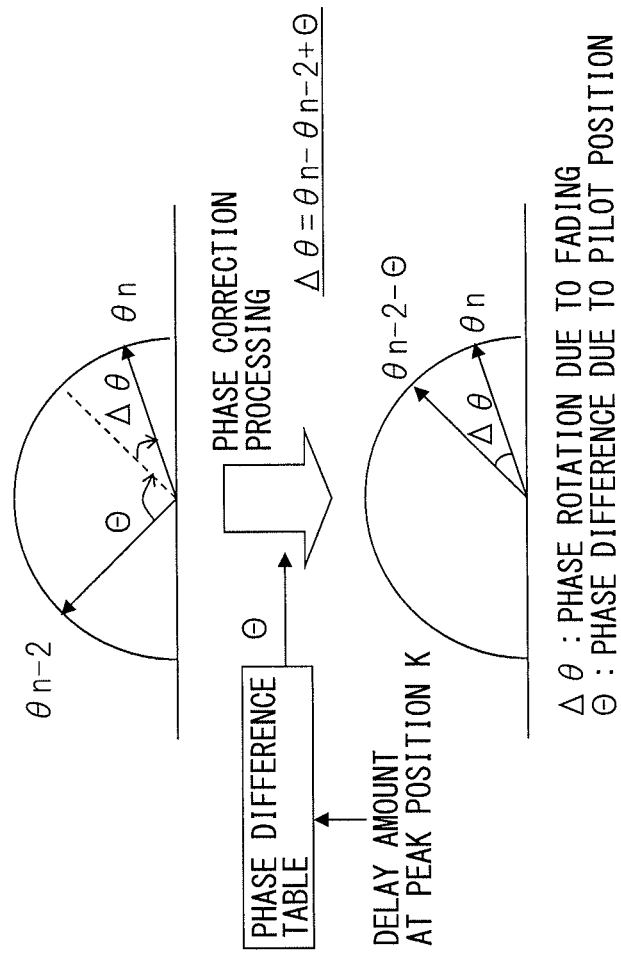
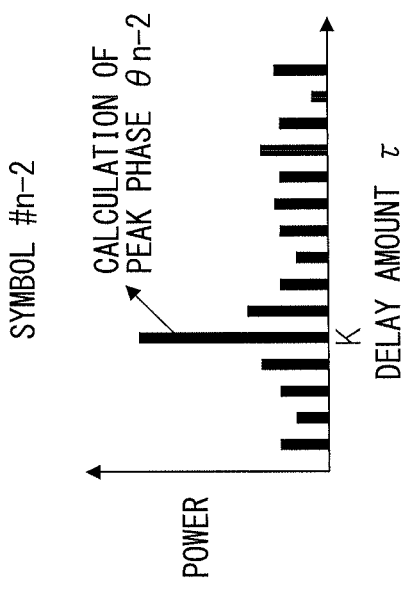
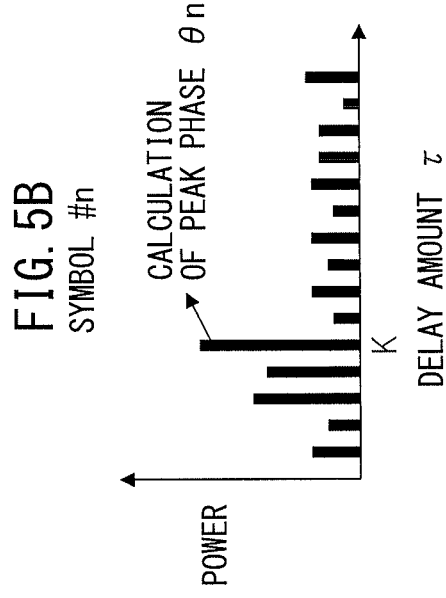
FIG. 5A
FIG. 5B
FIG. 5C

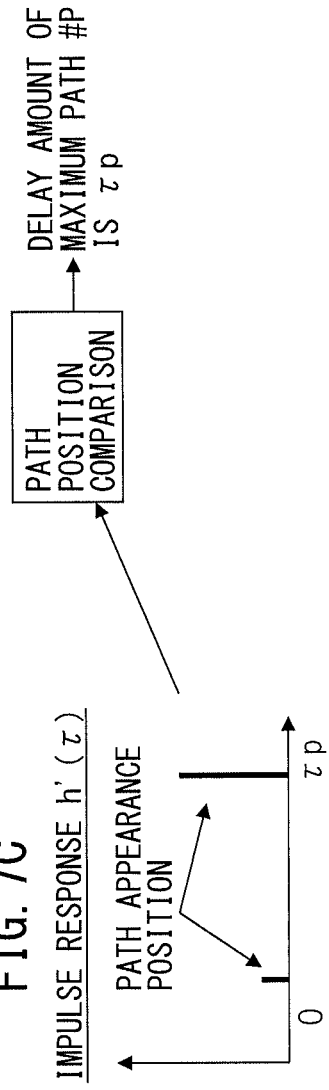
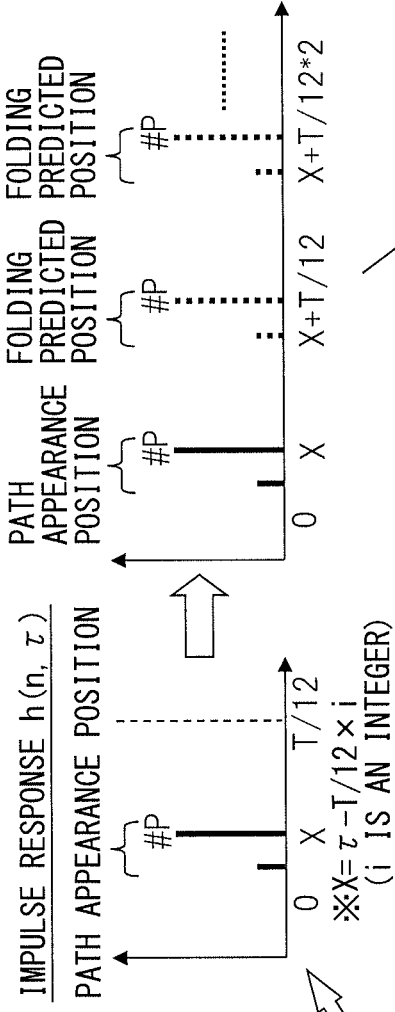
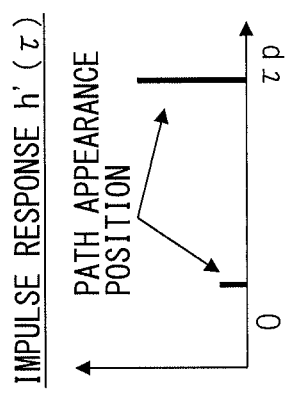
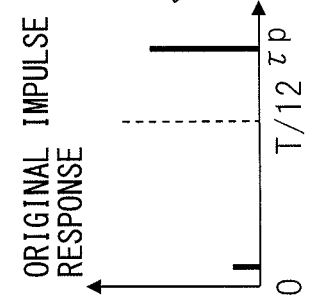

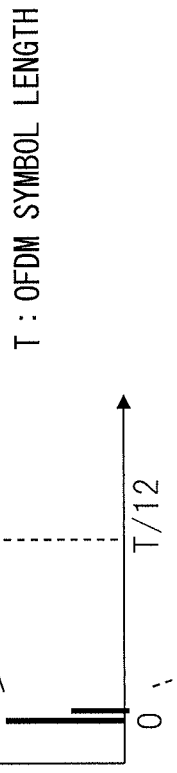

FIG. 8A
WHEN DELAY WAVE DELAY AMOUNT A=T/12
ORIGINAL IMPULSE RESPONSE

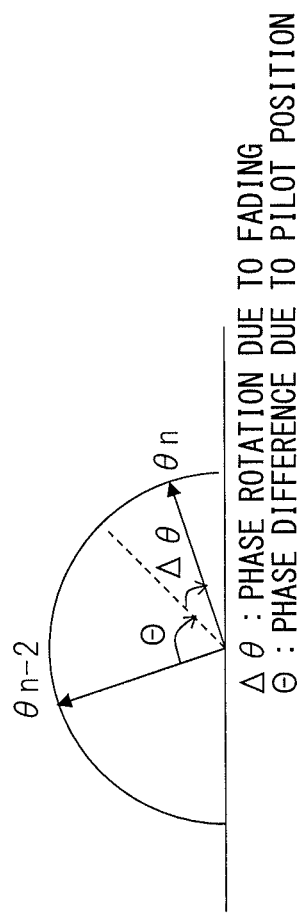

FIG. 8B
IMPULSE RESPONSE $h(n, \tau)$
MAIN WAVE AND DELAY WAVE EXIT MIXEDLY
T : OFDM SYMBOL LENGTH
PEAK PHASE
ESTIMATION BY PILOT SIGNAL ACCURATE VALUE OF PHASE DIFFERENCE Θ DUE TO PILOT POSITION IS NOT KNOWN BECAUSE MAIN WAVE AND DELAY WAVE MIX

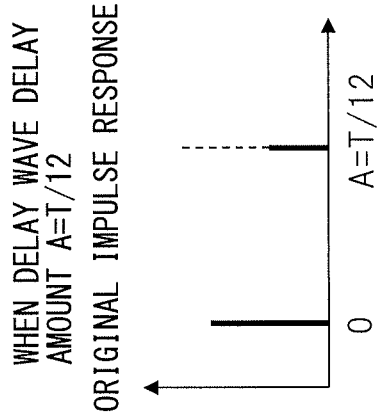

FIG. 8C
Δθ : PHASE ROTATION DUE TO FADING
Θ : PHASE DIFFERENCE DUE TO PILOT POSITION

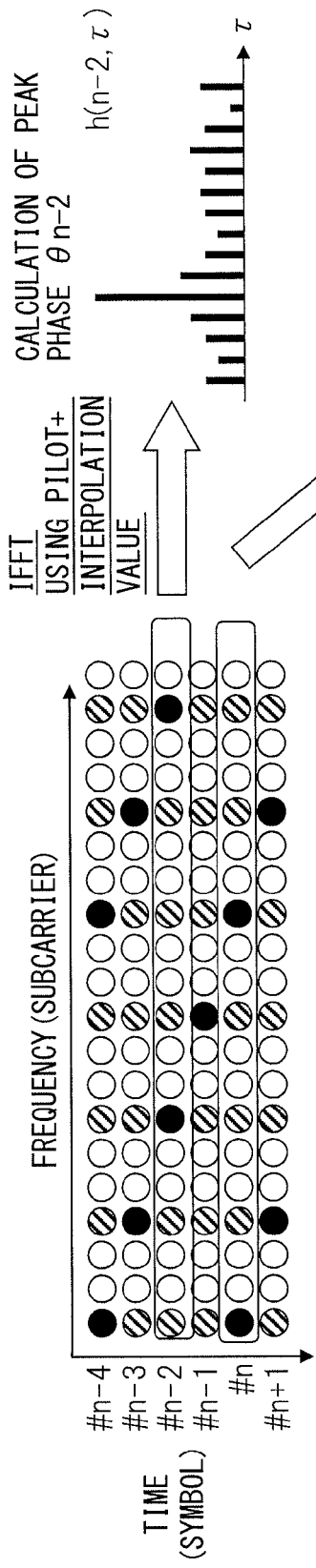
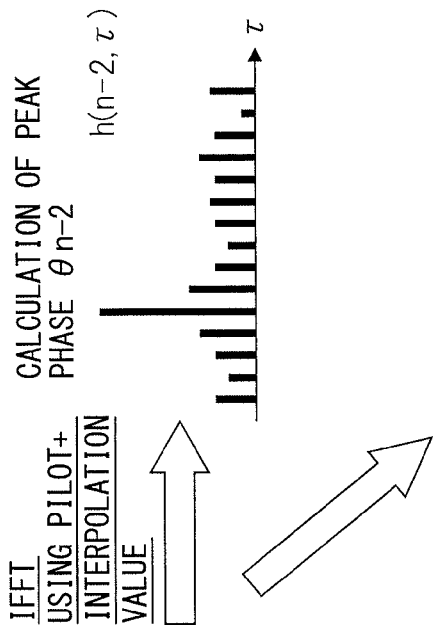
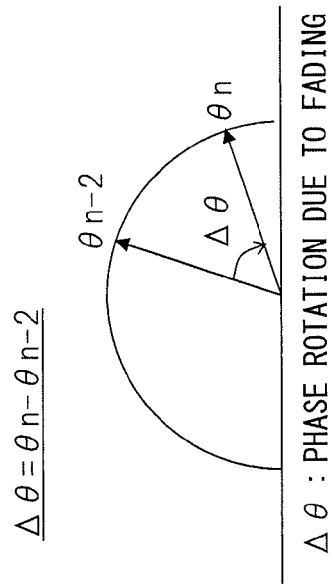
FIG. 12A
FIG. 12B
CALCULATION OF PEAK PHASE $\theta_{n-2}$
FIG. 12C
CALCULATION OF PEAK PHASE $\theta_n$
FIG. 12D
$\Delta\theta = \theta_n - \theta_{n-2}$
IFFT USING PILOT+INTERPOLATION VALUE
IMPULSE RESPONSE
$\Delta\theta$ : PHASE ROTATION DUE TO FADING

RECEIVING DEVICE AND RECEIVING METHOD FOR DETERMINING DOPPLER FREQUENCY FROM PILOT SIGNALS USING OFDM

CROSS-REFERENCE TO RELATED APPLICATION

This application is based upon and claims the benefit of priority of the prior Japanese Patent Application No. 2012-107558, filed on May 9, 2012, the entire contents of which are incorporated herein by reference.

FIELD

The present invention relates to a receiving device and a receiving method for receiving OFDM signals.

BACKGROUND

A communication system having an OFDM (Orthogonal Frequency Division Multiplexing) frame has been known and it has been adopted in ISDB-T (Integrated Services Digital Broadcasting-Terrestrial) of the Japanese integrated services digital broadcasting terrestrial standard. If a receiving device moves in a Rayleigh environment in which multiply scattered waves due to a multipath are received, the received frequency varies irregularly due to the Doppler effect. Because of this, fluctuations in received frequency are taken into consideration for a receiving device and in a receiving device for terrestrial digital broadcasting, demodulation processing that has taken into consideration the influence of the Doppler shift, which is a phenomenon in which the carrier frequency shifts at the time of reception while moving, is performed. A difference between the frequency of a signal and the frequency of the signal having changed due to the Doppler shift is a Doppler frequency.

In the case of a receiving device adopting the OFDM system, the influence of fluctuations in frequency due to the Doppler effect appears as fluctuations in phase in the symbol direction. Because of this, in OFDM propagation path estimation, interpolation is performed while taking into consideration the fluctuations in phase in the symbol direction. As a symbol interpolation coefficient, a flat coefficient is selected so that it is possible to perform reception robust to noise in the case where the Doppler frequency is small, i.e., in the case where fluctuations due to movement are small. However, in this case, there is such a problem that reception is vulnerable to fluctuations in phase. On the other hand, in the case where the Doppler frequency is large, i.e., in the case where fluctuations due to movement are large, a large weight is given to the center of the symbol interpolation coefficient so that reception is robust to fluctuations in phase. However, in this case, there is a problem that reception is vulnerable to noise.

It is desirable to select an optimum symbol interpolation coefficient in accordance with the Doppler frequency as described above, and in order to make such a selection, the Doppler frequency is estimated.

Into the OFDM frame of ISDB-T of the Japanese integrated services digital broadcasting terrestrial standard, SP (Scattered Pilot) signals are inserted at regular intervals and the pilot signals are arranged at 12-carrier intervals in the subcarrier (frequency) direction, which is the horizontal axis, and in the symbol (time) direction, the pilot signals are arranged so as to shift every three subcarriers between two successive symbols. There is a known technique hitherto, which estimates the Doppler frequency applied to the carrier frequency by reception while moving using pilot signals extracted from a received signal after a Fourier transform.

As a method for estimating the Doppler frequency from the OFDM signal, there are known a first method that makes use of pilot signals with different subcarrier numbers and a second method that makes use of pilot signals with the same subcarrier number.

In the second method, it is common to find a phase rotation amount of two pilot signals with the same subcarrier number of the received signals of different symbols and then, to estimate the Doppler frequency therefrom. In the case where the second method is performed in the OFDM frame configuration, such as that in the terrestrial digital method, a difference in phase between the pilot signal of the current symbol and that of the symbol four symbols ahead thereof is found and the phase rotation amount is found therefrom. However, by the second method, if the Doppler frequency is large and the phase rotation amount exceeds ±180 degrees, it is no longer possible to find an accurate phase rotation amount. Because of this, there has been the problem that it is not possible to estimate an accurate Doppler frequency by the second method in the case where the Doppler frequency is large.

In the first method, the Doppler frequency is found based on the phase rotation amount of two pilot signals with different subcarrier numbers of the received signals of different symbols. First, impulse responses are found by performing an inverse Fourier transform on the two different pilot signals, respectively. Then, peak positions of the impulse responses are found and the phase rotation amount of the two pilot signals at the peak positions is found. Then, the amounts of frequency shift of both the pilot signals and the phase correction amounts derived from the delay amount at the peak positions are added. The Doppler frequency is estimated from the corrected phase rotation amount. In the first method, it is possible to use pilot signals with different subcarrier numbers, and therefore, it is possible to find a phase rotation amount less than four symbols and to obtain an accurate Doppler frequency even in the case where the Doppler frequency is large compared to that in the second method. Because of this, in the normal case, it is desirable to obtain a Doppler frequency by applying the first method rather than the second method.

RELATED DOCUMENTS

[Patent Document 1] Japanese Laid Open Patent Document No. 2005-286636
[Patent Document 2] Japanese Laid Open Patent Document No. 2010-268274
[Patent Document 3] Japanese Laid Open Patent Document No. 2010-268044
[Patent Document 4] Japanese Laid Open Patent Document No. 2010-062865
[Patent Document 5] Japanese Laid Open Patent Document No. 2010-288178
[Non-Patent Document 1] D. Jitsukawa, et. al.: "Accurate Doppler frequency detection for OFDM", IEICE, General Conference 2004, B-5-77

SUMMARY

However, in the first method, folding occurs at 84-μsec intervals corresponding to $1/12$ of the OFDM symbol length in the impulse response found by an inverse Fourier transform of the pilot signal. Because of this, if a delay wave exists at the position of 84×iμsec (i is an integer) corresponding to the folding, it is no longer possible to accurately find a phase correction amount or to perform phase correction, and therefore, there is the problem that the estimation precision of the Doppler frequency deteriorates.

According to embodiments, a receiving device of OFDM signals which calculates the Doppler frequency with precision and performs demodulation processing with reduced influence of the Doppler shift in the propagation path environment with a multipath, the delay amount of which is large, is realized.

According to a first aspect of the embodiments, a receiving device for receiving OFDM signals in which arrangement of pilot signals changes with symbol time, includes: an inverse Fourier transform unit configured to calculate an impulse response by performing an inverse Fourier transform on pilot signals included in a received signal, which is the OFDM signal having been received and subjected to a Fourier transform; a first Doppler frequency estimation unit configured to estimate a first Doppler frequency from a phase rotation amount at peak positions between impulse responses of pilot signals of different subcarriers of the impulse responses calculated by the inverse Fourier transform; a second Doppler frequency estimation unit configured to estimate a second Doppler frequency from a phase rotation amount between impulse responses of pilot signals of the same subcarrier of the impulse responses calculated by the inverse Fourier transform; and a Doppler frequency selection unit configured to select one of the first and the second Doppler frequency estimated by the first and the second Doppler frequency estimation unit.

According to a second aspect of the embodiments, a receiving method for receiving OFDM signals in which arrangement of pilot signals changes with symbol time, includes: calculating an impulse response by performing an inverse Fourier transform on pilot signals included in a received signal, which is the OFDM signal having been received and subjected to a Fourier transform; estimating a first Doppler frequency from a phase rotation amount at peak positions between impulse responses of pilot signals of different subcarriers of the impulse responses calculated by the inverse Fourier transform; estimating a second Doppler frequency from a phase rotation amount between impulse responses of pilot signals of the same subcarrier of the impulse responses calculated by the inverse Fourier transform; and selecting one of the first and the second Doppler frequency.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 is a diagram illustrating examples of acquired impulse responses in symbols #n, #n-2, and #n-4;

FIG. 5A to FIG. 5C are diagrams explaining a method for deriving a phase rotation amount $\Delta\theta$ between the symbol #n and the symbol #n-2, which is performed by the two-symbol impulse response delay unit and the first phase deviation calculation unit;

FIGS. 7A to 7E are diagrams explaining details of processing to find a delay amount at the peak position by the peak position specifying unit;

FIG. 8A to FIG. 8C are diagrams explaining calculation processing of the phase rotation amount (phase difference) $\Delta\theta$ in the first phase deviation calculation unit in the case where the delay amount difference between the main wave and the delay wave is equal to T/12;

FIGS. 12A to 12D are diagrams explaining a method for deriving the phase rotation amount $\Delta\theta$, which is performed by the second Doppler frequency estimation unit in the second embodiment.

DESCRIPTION OF EMBODIMENTS

Hereinafter, embodiments are explained specifically with reference to the drawings.

Figure 1:
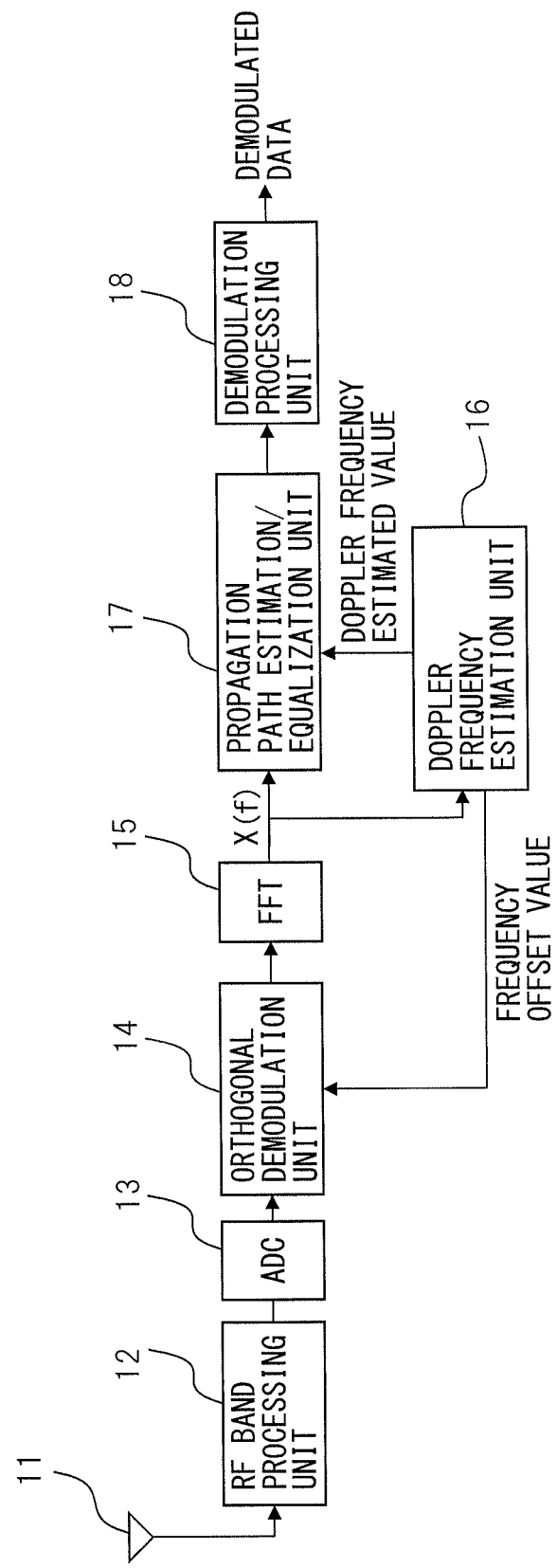
FIG. 1 is a block diagram illustrating a general configuration of an OFDM receiving device of a first embodiment.

FIG. 1 is a block diagram illustrating a general configuration of an OFDM receiving device of a first embodiment.

The OFDM receiving device has an antenna 11, an RF band processing unit 12, an A/D converter (ADC) 13, an orthogonal demodulation unit 14, a fast Fourier transform unit (FFT) 15, a Doppler frequency estimation unit 16, a transmission path estimation/equalization unit 17, and a demodulation processing unit 18. The orthogonal demodulation unit 14, the fast Fourier transform unit (FFT) 15, the Doppler frequency estimation unit 16, the transmission path estimation/equalization unit 17, and the demodulation processing unit 18 are implemented by, for example, software processing in a computer.

The antenna 11 receives OFDM signals. The RF band processing unit 12 down-converts processing and processing of the RF band, such as orthogonal demodulation, on OFDM signals received by the antenna. The ADC 13 converts an analog signal down-converted in the RF band processing unit 12 into a digital signal. The orthogonal demodulation unit 14 demodulates a digital signal into a base band signal and generates I and Q signals. The FFT 15 generates a frequency signal X (f) by performing Fourier transform processing on the orthogonally demodulated I and Q signals. The Doppler frequency estimation unit 16 extracts pilot signals arranged in accordance with the frame configuration from the frequency signal X (f) and estimates a Doppler frequency and a frequency offset value based on the signals. The transmission path estimation/equalization unit 17 estimates the propagation path and equalization processing of the received signal X (f) while adaptively switching between estimation and equalization processing based on the Doppler frequency and the frequency offset value estimated by the Doppler frequency estimation unit 16. Further, the frequency offset value is used to correct a local frequency at the orthogonal demodulation unit 14 in view of that it is generated by a shift in the local oscillation frequency at the orthogonal demodulation unit 14.

The demodulation processing unit 18 demaps a code point of an equalized signal, error correction processing, etc.

Figure 2:
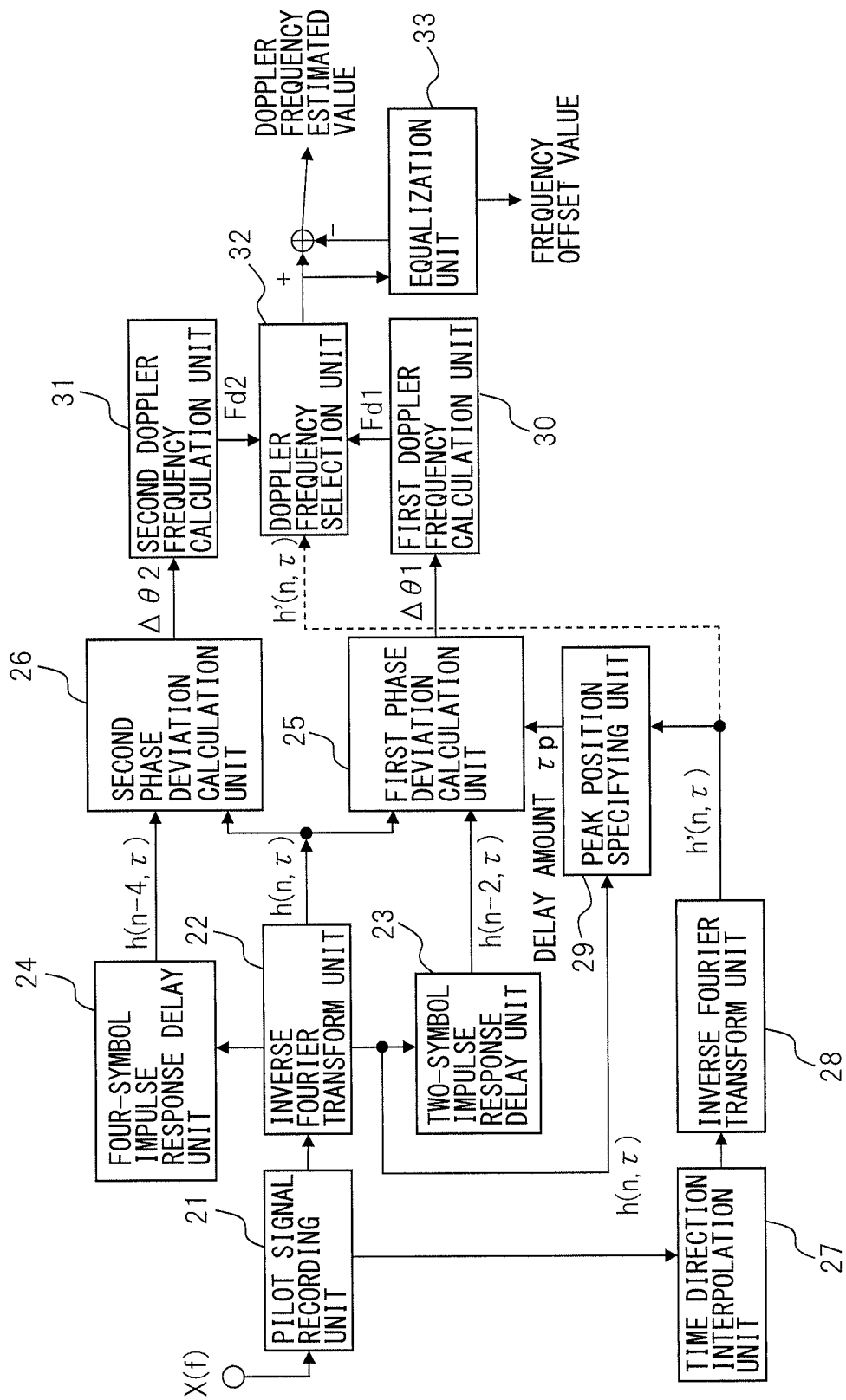
FIG. 2 is a diagram illustrating a configuration of the Doppler frequency estimation unit in the first embodiment.

FIG. 2 is a diagram illustrating a configuration of the Doppler frequency estimation unit 16 in the first embodiment.

The Doppler frequency estimation unit 16 has a pilot signal recording unit 21, an inverse Fourier transform unit (IFFT) 22, a two-symbol impulse response delay unit 23, a four-symbol impulse response delay unit 24, a first phase deviation calculation unit 25, and a second phase deviation calculation unit 26. The Doppler frequency estimation unit 16 further has a time direction interpolation unit 27, an inverse Fourier transform unit (IFFT) 28, a peak position specifying unit 29, a first Doppler frequency calculation unit 30, a second Doppler frequency calculation unit 31, a Doppler frequency selection unit 32, and an averaging circuit 33. The two-symbol impulse response delay unit 23, the first phase deviation calculation unit 25, the peak position specifying unit 29, and the first Doppler frequency calculation unit 30 form a first Doppler frequency estimation unit. Further, the first Doppler frequency estimation unit includes the time direction interpolation unit 27 and the inverse fast Fourier transform unit (IFFT) 28. The first Doppler frequency estimation unit estimates a first Doppler frequency Fd1 from the phase rotation amount at the peak positions between the impulse responses of pilot signals of different subcarriers of the impulse responses calculated by an inverse Fourier transform. The four-symbol impulse response delay unit 24, the second phase deviation calculation unit 26, and the second Doppler frequency calculation unit 31 form a second Doppler frequency estimation unit. The second Doppler frequency estimation unit estimates a second Doppler frequency Fd2 from the phase rotation amount between the impulse responses of pilot signals of the same subcarrier of the impulse responses calculated by an inverse Fourier transform.

Figure 3:
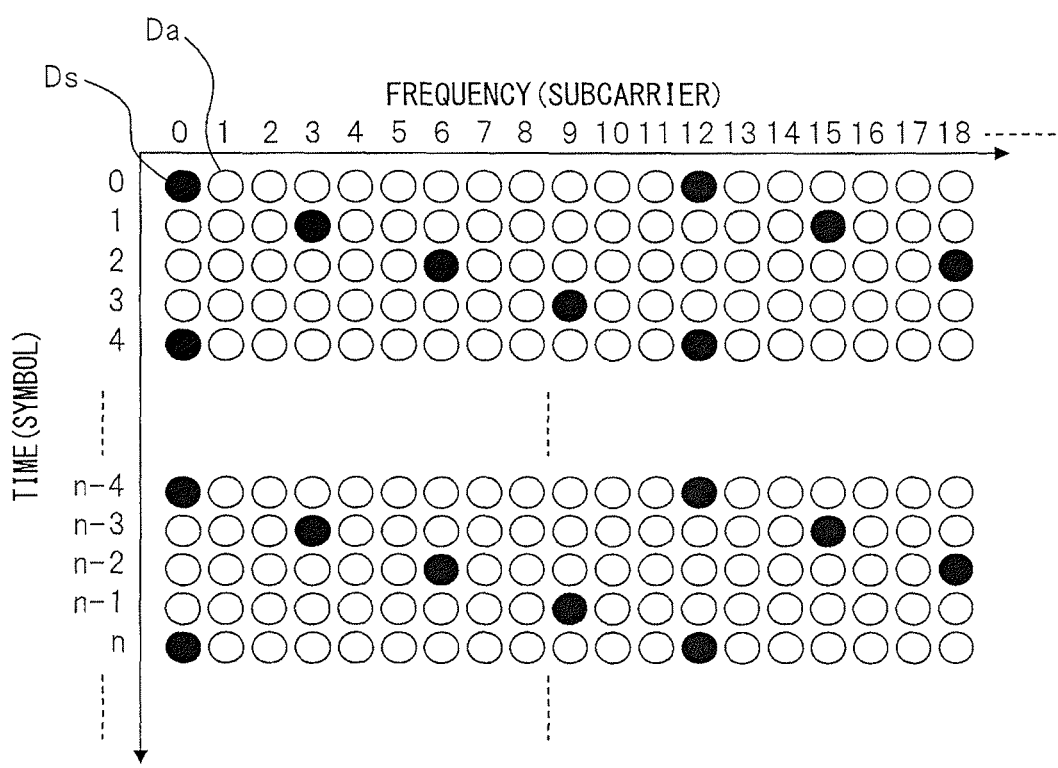
FIG. 3 is a diagram illustrating a frame configuration example of an OFDM signal.

FIG. 3 is a diagram illustrating a frame configuration example of an OFDM signal.

In FIG. 3, the horizontal axis represents frequency and the vertical axis represents time. As widely known, an OFDM signal has a signal group in the form of a matrix including a plurality of subcarriers with different frequencies and a plurality of symbols at each of successive times. Symbols are arranged in the time direction, and therefore, the time of each symbol is referred to as a symbol time. In the frame configuration example of an OFDM signal of FIG. 3, the symbol length (number of symbols×time) is just an integer multiple of each subcarrier. In a certain symbol, each subcarrier is in a certain phase and if the symbol changes, the phase rotation amount of each subcarrier also changes. In FIG. 3, the subcarrier represented by a black circle (Ds) is a subcarrier including a pilot signal and in one symbol, it is inserted into every 12 subcarriers and in the next neighboring symbol, it is inserted into every 12 subcarriers shifted by three subcarriers, and so on.

The pilot signal recording unit 21 extracts pilot signals of a subcarrier group subjected to a Fourier transform by the FFT 15.

The inverse Fourier transform unit 22 performs an inverse Fourier transform on the pilot signals output from the pilot signal recording unit 21. As is widely known in the field of Fourier transform, if pilot signals are subjected to an inverse Fourier transform, an impulse response (distribution of signal strength spread in the time direction) is calculated.

FIG. 4 is a diagram illustrating examples of acquired impulse responses in symbols #n, #n-2, and #n-4. Hereinafter, a subcarrier is sometimes abbreviated simply to a carrier. The pilot signal is inserted into the same carrier at every four symbols, and therefore, #n and #n-4 are a pilot signal group configured by the same carrier numbers and #n and #n-2 are configured by pilot signal groups between which the frequencies are shifted by an amount corresponding to six carriers. By performing an inverse Fourier transform on each of the pilot signal groups, impulse response waveforms as illustrated on the right side of FIG. 4 can be obtained. In this case, the horizontal axis represents the delay amount and the vertical axis represents power. This impulse response indicates the multipath response of the propagation path, and therefore, is also referred to as a delay profile. In the case where reception while moving is being performed, phase rotation is caused due to the influence of fading and the amplitudes and phases of impulse responses between different symbols become different values. The phase rotation amount at this time is proportional to the Doppler frequency caused in the carrier wave. Because of this, it is possible to find the Doppler frequency from the phase rotation amount of the impulse response between symbols during a fixed period of time.

FIG. 5A to FIG. 5C are diagrams explaining a method for deriving a phase rotation amount $\Delta\theta$ between the symbol #n and the symbol #n-2, which is performed by the two-symbol impulse response delay unit 23 and the first phase deviation calculation unit 25. FIG. 5A illustrates an impulse response of the symbol #n-2, FIG. 5B illustrates an impulse response of the symbol #n, and FIG. 5C illustrates a phase difference $\Theta$ due to a difference between positions of the pilot signals and the phase rotation amount $\Delta\theta$ due to fading, respectively.

The two-symbol impulse response delay unit 23 delays the impulse response of the symbol #n-2 found by the inverse Fourier transform unit 22 by an amount corresponding to two symbols and outputs it to the first phase deviation calculation unit 25. The first phase deviation calculation unit 25 receives the impulse response of the symbol #n found by the inverse Fourier transform unit 22 and the impulse response of the symbol #n-2 delayed by an amount corresponding to two symbols by the two-symbol impulse response delay unit 23. The first phase deviation calculation unit 25 compares the two impulse responses and finds peak phase amounts $\theta_{n-2}$ and $\theta_n$ at peak positions K of power in the impulse responses, respectively, and a phase difference between them. This peak phase difference includes the phase difference $\Theta$ caused resulting from the frequency shift between the pilot signals of the symbols #n and #n-2, in addition to the phase rotation amount $\Delta\theta$ due to fading. Because of this, the peak phase difference will be $(\theta_n - \theta_{n-2}) = \Delta\theta + \Theta$.

The phase difference $\Theta$ is proportional to the frequency of the pilot signal and the delay amount at a peak position #P of the impulse response. Because of this, the path delay amount at the peak position #P is found and the phase difference $\Theta$ corresponding thereto is calculated by calculation or using a table, etc. The phase rotation amount (phase difference) $\Delta\theta$ is found by the following equation using the phase difference $\Theta$ and the peak phase that are found $$\Delta\theta = \text{peak phase difference} - \Theta = \theta_n - \theta_{n-2} - \Theta.$$

Here processing in the time direction interpolation unit 27, the inverse Fourier transform unit 28, and the peak position specifying unit 29 is explained.

An impulse response $h(n, \tau)$ of the pilot signal is the signals at 12-carrier intervals subjected to the inverse Fourier transform, and therefore, the impulse response can be measured only to $1/12$ of an OFDM symbol length T.

Figure 6A:
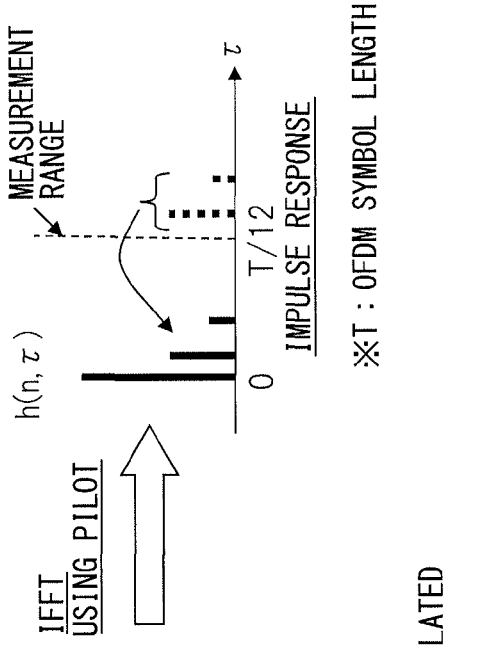
FIG. 6A to FIG. 6D are diagrams explaining a method for calculating a path delay amount in the case where the path delay amount at the peak position in the impulse response exceeds T/12.
Figure 6B:
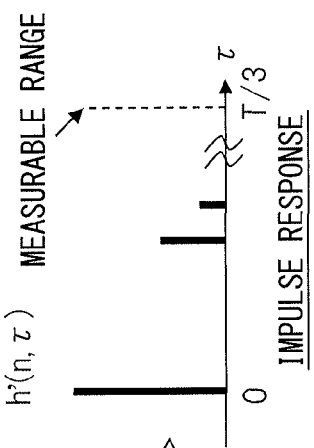
Figure 6C:
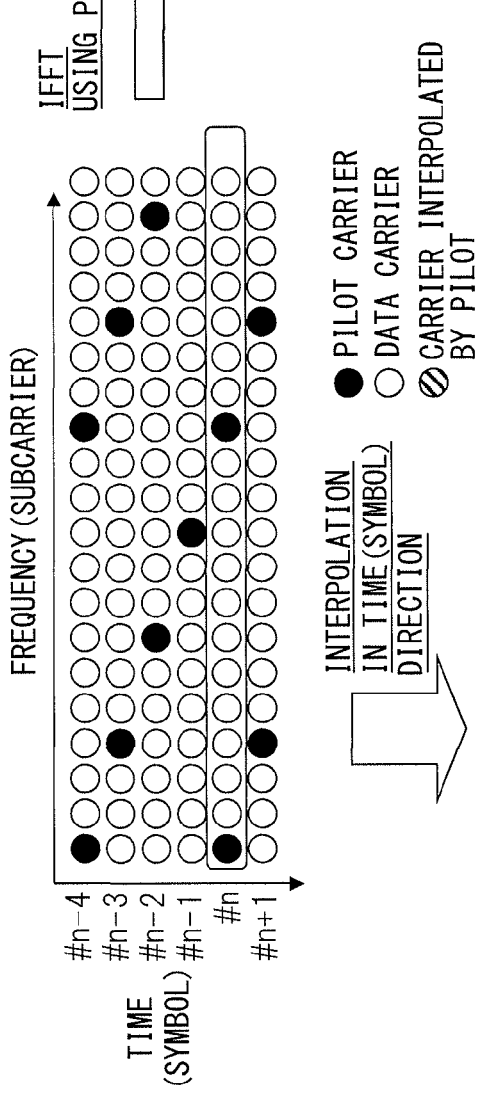
Figure 6D:
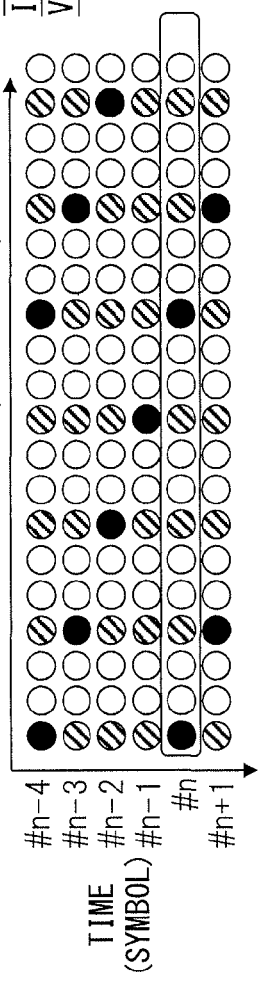

FIG. 6A to FIG. 6D are diagrams explaining a method for calculating a path delay amount in the case where the path delay amount at the peak position in the impulse response exceeds T/12. FIG. 6A illustrates an OFDM frame, FIG. 6B illustrates a path delay amount exceeding T/12 in the impulse response, FIG. 6C illustrates a frame configuration in which the pilot signals are interpolated in the time direction, and FIG. 6D illustrates a measurable range in the case where interpolation is performed.

As illustrated in FIG. 6B, a delay wave whose path delay amount at the peak position exceeds T/12 produces a virtual image at a position of folding at T/12 and it is not possible to obtain an accurate delay amount. Because of this, an impulse response h' (n, τ) is used, which is derived by interpolating the pilot signals in the time direction and subjecting the carrier group with three-carrier intervals of the pilot signal plus interpolation value to an inverse Fourier transform. Specifically, the time direction interpolation unit 27 performs interpolation in the time (symbol) direction for the OFDM signal from the pilot signal storage unit 21. The inverse Fourier transform unit 28 calculates h' (n, τ) by performing an inverse Fourier transform on the interpolated signals. This impulse response is obtained by an inverse Fourier transform at three-carrier intervals, and therefore, it is possible to measure the impulse response to ⅓ of the OFDM symbol length T. Then, by matching the two impulse responses, the delay amount at the peak position #P is found. This method is widely known, and therefore, is briefly explained.

FIGS. 7A to 7E are diagrams explaining details of processing to find a delay amount at the peak position by the peak position specifying unit 29.

FIG. 7A illustrates a case where the path delay amount at the peak position #P is τp and τp>T/12. As illustrated in FIG. 7B, in this case, folding occurs in the impulse response (n, τ) and a path is observed at the position where the delay amount is X.

On the other hand, in h' (n, τ), no folding occurs and a path is observed at the position where the delay amount is Y (=τn) as illustrated in FIG. 7C.

In the case where the path delay amount of the maximum path of the impulse response h (n, τ) is X, it is possible to estimate the delay amount before its folding by X+T/12×i (i is an integer). Consequently, on the assumption that a path of h (n, τ) exists at the position of the delay amount X+T/12×i, the path is compared with the path information of h' (n, τ). Then, if X+T/12×i=Y holds, it is possible to estimate that the delay amount Y (=τp) is the original delay amount. In this manner, the delay amount at the peak position is found.

The first phase deviation calculation unit 25 calculates the phase rotation amount (phase difference) Δθ by taking into consideration the peak position and the delay amount specified by the peak position specifying unit 29. The first Doppler frequency calculation unit 30 calculates the first Doppler frequency Fd1 based on the phase rotation amount (phase difference) Δθ calculated by the first phase deviation calculation unit 25.

FIG. 8A to FIG. 8C are diagrams explaining calculation processing of the phase rotation amount (phase difference) Δθ in the first phase deviation calculation unit 25 in the case where the delay amount difference between the main wave and the delay wave is equal to T/12.

As illustrated in FIG. 8A, in the case where the delay amount difference between the main wave and the delay wave is equal to T/12, a path appears, in which the main wave and folding of the delay wave exist mixedly, as illustrated in FIG. 8B. In this case, the phase difference Θ due to the positions of the pilot signals varies depending on the power ratio between the main wave and the delay wave, and therefore, it is no longer possible to derive the accurate phase difference Θ. Consequently, in such a multipath environment, it is no longer possible to calculate an accurate Doppler frequency.

Further, if the delay amount at the peak position obtained by the peak position specifying unit 29 is erroneous, an error of T/12×i occurs in the delay amount and in this case, the Doppler frequency precision deteriorates considerably. Consequently, it is not possible to perform accurate frequency calculation in every environment by the first Doppler frequency estimation unit alone.

Figure 9C:
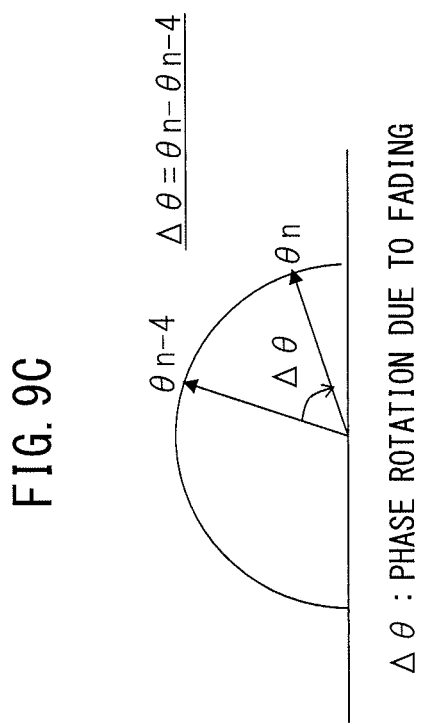
FIG. 9A to FIG. 9C are diagrams explaining a method for deriving the phase rotation amount $\Delta\theta$ between the symbol #n and the symbol #n-4, which is performed by the four-symbol impulse response delay unit and the second phase deviation calculation unit.
Figure 9A:
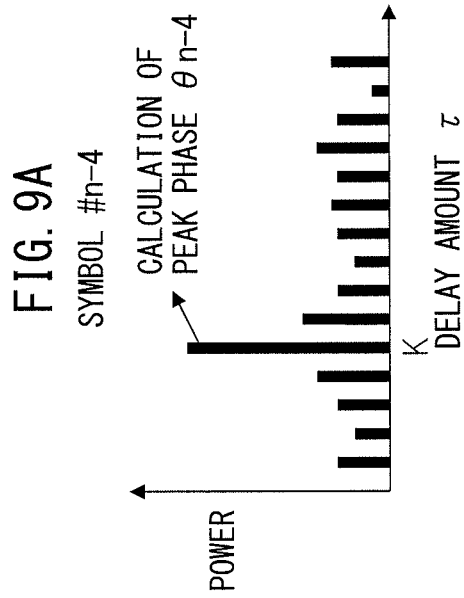
Figure 9B:
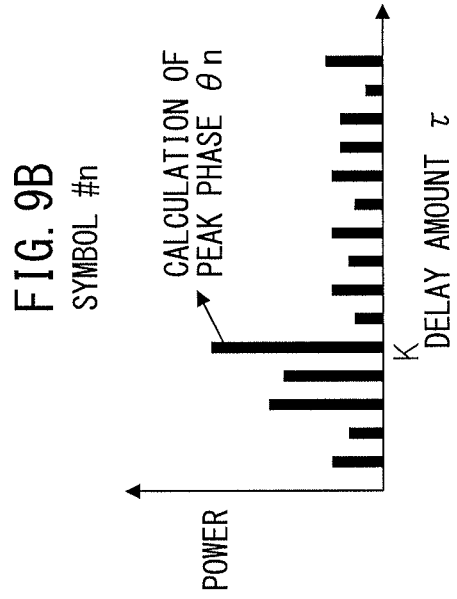

FIG. 9A to FIG. 9C are diagrams explaining a method for deriving the phase rotation amount Δθ between the symbol #n and the symbol #n-4, which is performed by the four-symbol impulse response delay unit 24 and the second phase deviation calculation unit 26. FIG. 9A illustrates the impulse response of the symbol #n-4, FIG. 9B illustrates the impulse response of the symbol #n, and FIG. 9C illustrates the phase rotation amount Δθ due to fading, respectively.

The 4-symbol impulse response delay unit 24 delays the impulse response of the symbol #n-4 found by the inverse Fourier transform unit 22 by an amount corresponding to four symbols and outputs it to the second phase deviation calculation unit 26. The second phase deviation calculation unit 26 receives the impulse response of the symbol #n found by the inverse Fourier transform unit 22 and the impulse response of the symbol #n-4 delayed by an amount corresponding to four symbols by the 4-symbol impulse response delay unit 24. The second phase deviation calculation unit 26 compares the two impulse responses and finds the peak phase amounts θn−4 and θn at the peak positions K of power in the impulse responses, respectively, and a phase different therebetween. The peak phase difference is the phase rotation amount Δθ due to fading. The symbol #n and the symbol #n-4 use the pilot signal group of the same subcarrier, and therefore, Θ=0, and phase correction processing does not need to be performed.

The second Doppler frequency calculation unit 31 calculates the second Doppler frequency Fd2 based on the phase rotation amount (phase difference) Δθ calculated by the second phase deviation calculation unit 26.

The second phase deviation calculation unit 26 finds the phase rotation at four-symbol intervals, and therefore, if the Doppler frequency is large, the phase rotation amount exceeds ±180 degrees. In this case, it is no longer possible for the second phase deviation calculation unit 26 to find the accurate phase rotation amount (phase difference) Δθ and it is no longer possible for the second Doppler frequency calculation unit 31 to calculate the accurate second Doppler frequency Fd2.

Consequently, in the first embodiment, the Doppler frequency estimation unit 16 selects one of the first Doppler frequency Fd1 calculated by the first Doppler frequency calculation unit 30 and the second Doppler frequency Fd2 calculated by the second Doppler frequency calculation unit 31, which is more reliable.

Specifically, the first Doppler frequency estimation unit uses the pilot signals with different subcarrier numbers, and therefore, it is possible to find the phase rotation amount less than four symbols and to obtain an accurate Doppler frequency even when the Doppler frequency is large. Consequently, in the present embodiment, in the case where the first Doppler frequency Fd1 estimated by the first Doppler frequency estimation unit is reliable, the first Doppler frequency Fd1 is adopted. Then, in the case where the reliability of the first Doppler frequency Fd1 deteriorates as described above, whether the second Doppler frequency Fd2 estimated by the second Doppler frequency estimation unit can be relied upon, and if it can be relied upon, the second Doppler frequency Fd2 is adopted. If the second Doppler frequency Fd2 is not relied upon, the first Doppler frequency Fd1 is adopted.

Figure 10:
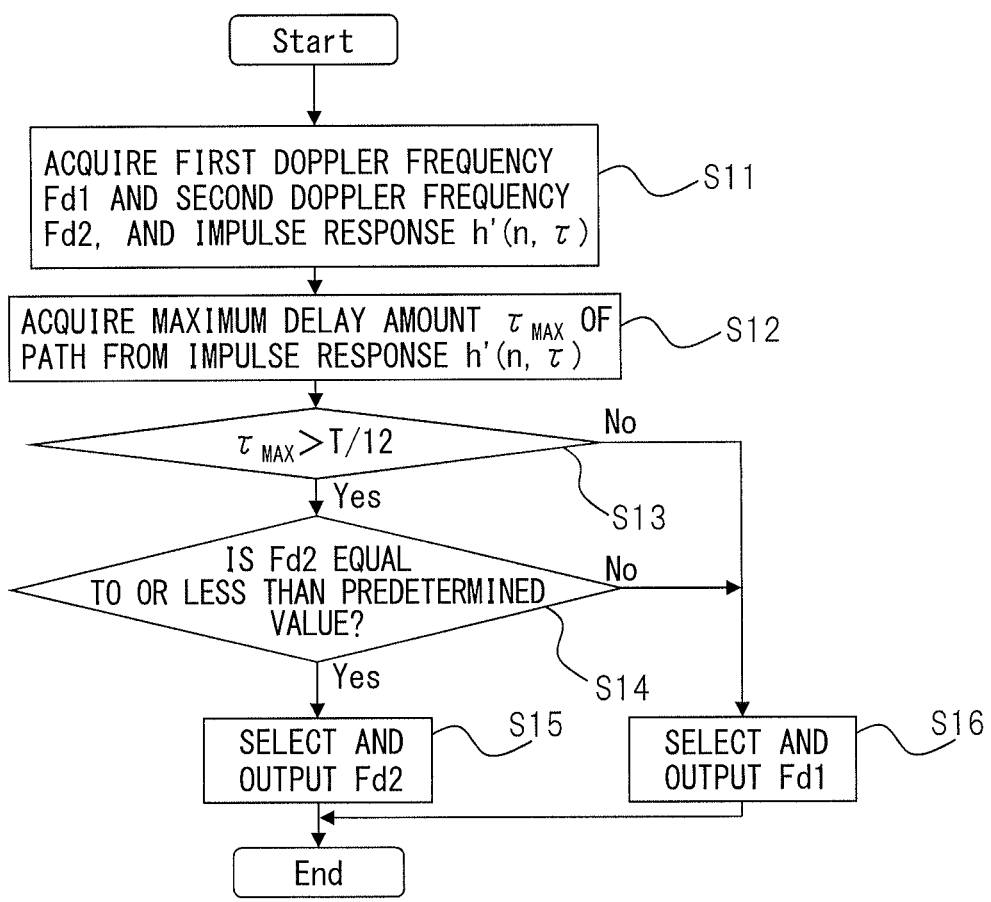
FIG. 10 is a flowchart illustrating the operation of the receiving device of the first embodiment.

FIG. 10 is a flowchart illustrating the operation of the receiving device of the first embodiment.

At step S11, the first Doppler frequency estimation unit acquires the first Doppler frequency Fd1 and the second Doppler frequency estimation unit acquires the second Doppler frequency Fd2, respectively. Further, the time direction storage unit 27 and the inverse Fourier transform unit 28 acquire the impulse response h' (n, τ) from the pilot signals subjected to time interpolation.

At step S12, the Doppler frequency selection unit 32 acquires a maximum delay amount τMAX of the path from the impulse response h' (n, τ).

At step S13, the Doppler frequency selection unit 32 determines whether the maximum delay amount τMAX of the path exceeds T/12 and if it exceeds, the procedure proceeds to step S14 and if not, the procedure proceeds to step S16. In the case where the maximum delay amount τMAX of the path does not exceed T/12, the first Doppler frequency Fd1 can be relied upon, and therefore, the first Doppler frequency Fd1 is adopted at step S16.

At step S14, whether the second Doppler frequency Fd2 is equal to or less than a predetermined value is determined and if it is equal to or less than the predetermined value, the procedure proceeds to step S15 and if not, the procedure proceeds to step S16. In the case where the second Doppler frequency Fd2 is equal to or less than the predetermined value, the second Doppler frequency Fd2 can be relied upon, and therefore, the second Doppler frequency Fd2 is adopted. In the case where the second Doppler frequency Fd2 is more than the predetermined value, the reliability of the second Doppler frequency Fd2 is poor, and therefore, the first Doppler frequency Fd1 is adopted at step S16.

The equalization circuit 33 calculates a frequency offset from the Doppler frequency selected by the Doppler frequency selection unit 32. In the case of direct waves or where there is a shift in the PLL circuit of the RF band processing unit, an offset occurs in transition of the received frequency. In other words, the center frequency of the carrier frequency shifts from fc. If a frequency transition exists, the Doppler frequency that is estimated actually tends to become an estimated value larger than an estimated value fd of the original Doppler frequency. Because of this, the Doppler frequency selected by the Doppler frequency selection unit 32, from which the frequency offset calculated by the equalization circuit 32 is subtracted, is taken to be the final Doppler frequency estimated value.

Figure 11:
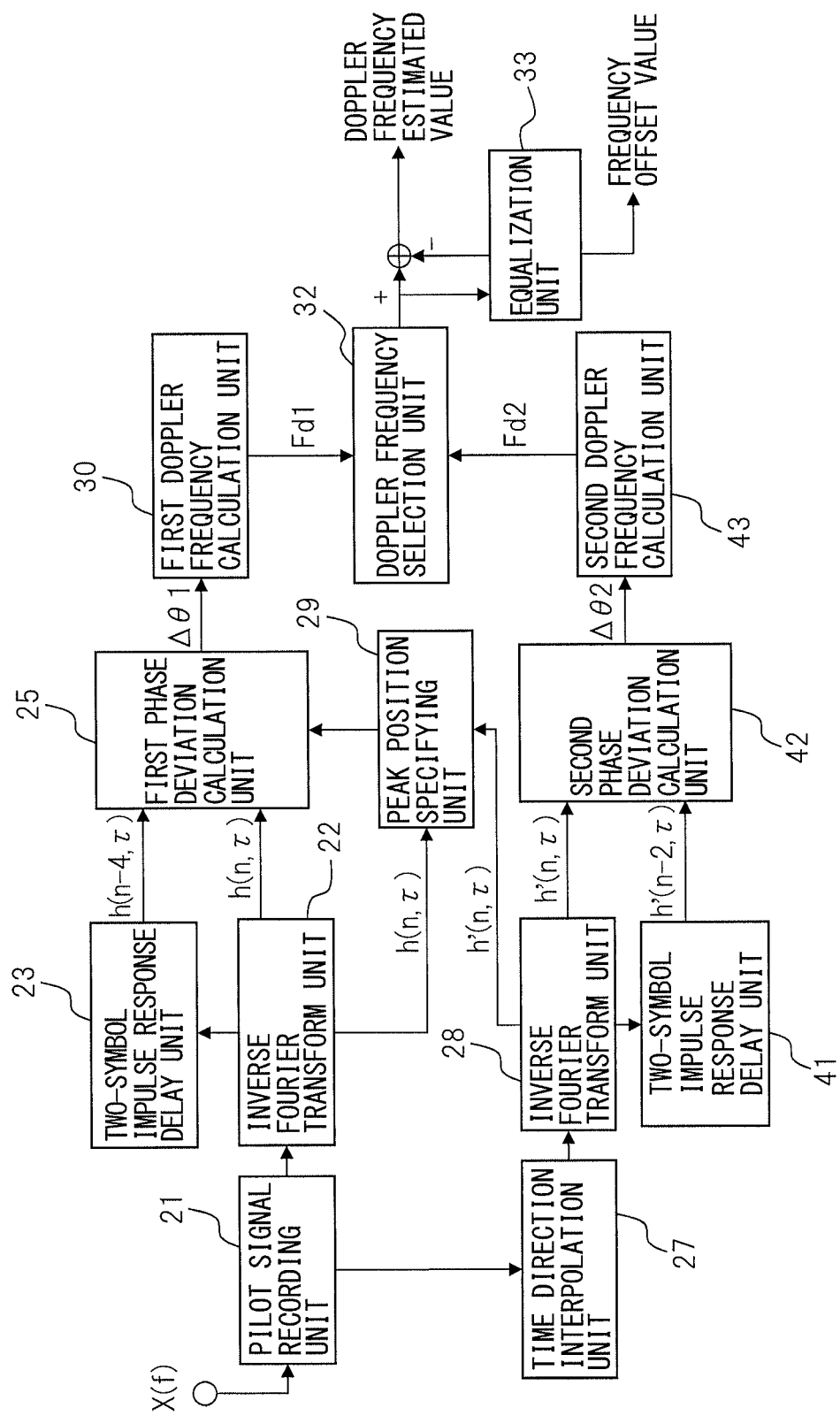
FIG. 11 is a diagram illustrating a configuration of the Doppler frequency estimation unit in a receiving device of a second embodiment.

FIG. 11 is a diagram illustrating a configuration of the Doppler frequency estimation unit 16 in a receiving device of a second embodiment. The receiving device of the second embodiment differs from the receiving device of the first embodiment only in the Doppler frequency estimation unit 16 and other parts are the same as those of the first embodiment.

The Doppler frequency estimation unit 16 in the second embodiment differs in that the second Doppler frequency estimation unit differs from that of the first embodiment, and other parts are the same.

The second Doppler frequency estimation unit in the second embodiment includes a two-symbol impulse response delay unit 41, a second phase deviation calculation unit 42, and a second Doppler frequency calculation unit 43.

The inverse Fourier transform unit 28 performs an inverse Fourier transform on the carrier signal group output from the time direction interpolation unit 27 and including the pilot signals and the interpolated pilot signals used for interpolation of the pilot signals as illustrated in FIG. 6(C), and outputs the impulse response h' (n, τ). The two-symbol impulse response delay unit 41 delays the impulse response h' (n, τ) by an amount corresponding to two symbols and outputs a two-symbol delayed impulse response h' (n-2, τ). The second phase deviation calculation unit 42 calculates a phase difference Δθ2 between the impulse response h' (n, τ) output from the inverse Fourier transform unit 28 and the two-symbol delayed impulse response h' (n-2, τ) output from the two-symbol impulse response delay unit 41. The second Doppler frequency calculation unit 43 calculates the second Doppler frequency Fd2 from the phase difference Δθ2 as in the first embodiment.

FIGS. 12A to 12D are diagrams explaining a method for deriving the phase rotation amount Δθ, which is performed by the second Doppler frequency estimation unit in the second embodiment. FIG. 12A illustrates a carrier signal group including pilot signals and interpolated pilot signals used for interpolation of the pilot signals. FIG. 12B illustrates the two-symbol delayed impulse response h' (n-2, τ) and FIG. 12C illustrates the impulse response h' (n, τ). FIG. 12D illustrates the phase rotation amount Δθ due to fading.

As illustrated in FIG. 12A, the interpolation value after interpolation in the time direction is inserted at three-carrier intervals in the carrier direction and it is possible to make use of the same subcarrier regardless of the symbol (time) and phase correction does not need to be performed in the processing to calculate the phase rotation amount Δθ. Because of this, it is possible to set the intervals of the phase rotation calculation of the impulse response to four symbols or less. In the configuration of FIG. 11, an example of two-symbol intervals is illustrated, however, other intervals may be accepted.

All examples and conditional language provided herein are intended for pedagogical purposes of aiding the reader in understanding the invention and the concepts contributed by the inventor to furthering the art, and are to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A receiving device for receiving OFDM signals in which arrangement of pilot signals changes with symbol time, comprising:
    an inverse Fourier transform unit configured to calculate an impulse response by performing an inverse Fourier transform on pilot signals included in a received signal, which is the OFDM signal having been received and subjected to a Fourier transform;
    a first Doppler frequency estimation unit configured to estimate a first Doppler frequency from a phase rotation amount at peak positions between impulse responses of pilot signals of different subcarriers of the impulse responses calculated by the inverse Fourier transform;
    a second Doppler frequency estimation unit configured to estimate a second Doppler frequency from a phase rotation amount between impulse responses of pilot signals of the same subcarrier of the impulse responses calculated by the inverse Fourier transform; and
    a Doppler frequency selection unit configured to select the first Doppler frequency in the case where a maximum delay amount of multipath does not exceed a measured range of impulse responses found by performing an inverse Fourier transform on the pilot signals, and select the second Doppler frequency in other cases.

2. The receiving device according to claim 1, wherein
the first Doppler frequency estimation unit:
- calculates a phase difference between impulse responses that occurs due to a difference in frequency between pilot signals of different subcarriers based on a delay amount at the peak position; and
- corrects the phase rotation amount by an amount corresponding to the calculated phase difference.

3. The receiving device according to claim 1, wherein the second Doppler frequency estimation unit matches symbol intervals between impulse responses of pilot signals of the same subcarrier to insertion intervals in the symbol direction of the pilot signal.

4. The receiving device according to claim 1, wherein the second Doppler frequency estimation unit performs interpolation processing of the pilot signals in the symbol direction, generates impulse responses obtained by performing an inverse Fourier transform on the interpolation values, calculates a phase rotation amount between the calculated impulse responses, and thus estimates the second Doppler frequency.

5. The receiving unit according to claim 1, wherein the Doppler frequency selection unit selects the first Doppler frequency even in the case where the maximum delay amount of multipath exceeds the measured range of impulse responses if the second Doppler frequency exceeds a predetermined value.

6. A receiving method for receiving OFDM signals in which arrangement of pilot signals changes with symbol time, comprising the steps of:
- calculating an impulse response by performing an inverse Fourier transform on pilot signals included in a received signal, which is the OFDM signal having been received and subjected to a Fourier transform;
- estimating a first Doppler frequency from a phase rotation amount at peak positions between impulse responses of pilot signals of different subcarriers of the impulse responses calculated by the inverse Fourier transform;
- estimating a second Doppler frequency from a phase rotation amount between impulse responses of pilot signals of the same subcarrier of the impulse responses calculated by the inverse Fourier transform; and
- selecting the first Doppler frequency in the case where a maximum delay amount of multipath does not exceed a measured range of impulse responses found by performing an inverse Fourier transform on the pilot signals, and selecting the second Doppler frequency in other cases.

* * * * *